(12) United States Patent
Fujiue et al.

(10) Patent No.: US 8,175,439 B2
(45) Date of Patent: May 8, 2012

(54) CURABLE COMPOSITION FOR OPTICAL MATERIAL AND OPTICAL WAVEGUIDE

(75) Inventors: Naofumi Fujiue, Tokyo (JP); Kenji Hara, Tokyo (JP); Yoshihiro Ishikawa, Tokyo (JP); Yoshikazu Shoji, Tokyo (JP)

(73) Assignee: Adeka Corporation, Tokyo (JP)

( * ) Notice: Subject to any disclaimer, the term of this patent is extended or adjusted under 35 U.S.C. 154(b) by 763 days.

(21) Appl. No.: 12/224,951

(22) PCT Filed: Mar. 7, 2007

(86) PCT No.: PCT/JP2007/054419
§ 371 (c)(1),
(2), (4) Date: Sep. 10, 2008

(87) PCT Pub. No.: WO2007/105556
PCT Pub. Date: Sep. 20, 2007

(65) Prior Publication Data
US 2009/0074374 A1 Mar. 19, 2009

(30) Foreign Application Priority Data
Mar. 10, 2006 (JP) ................................ 2006-066294

(51) Int. Cl.
*G02B 6/00* (2006.01)
*H01L 21/469* (2006.01)

(52) U.S. Cl. .................... 385/143; 385/141; 438/780

(58) Field of Classification Search .................... 385/143
See application file for complete search history.

(56) References Cited

U.S. PATENT DOCUMENTS
2004/0017994 A1  1/2004  Kodama et al.
2005/0239295 A1* 10/2005  Wang et al. ................... 438/780

FOREIGN PATENT DOCUMENTS
| JP | 2004-102247 | 4/2004 |
| JP | 2004-285125 | 10/2004 |
| JP | 2004-352771 | 12/2004 |
| JP | 2005-206787 | 8/2005 |
| JP | 2006-225515 | 8/2006 |
| JP | 2006-282988 | 10/2006 |
| WO | 2006/003990 | 1/2006 |

OTHER PUBLICATIONS

International Search Report dated Apr. 24, 2007 in the International (PCT) Application PCT/JP2007/054419 of which the present application is the U.S. National Stage.
Supplementary European Search Report issued Jan. 2, 2012 in corresponding European Application No. 07 73 7933.

* cited by examiner

*Primary Examiner* — Uyen Chau N Le
*Assistant Examiner* — Kajli Prince
(74) *Attorney, Agent, or Firm* — Wenderoth, Lind & Ponack, L.L.P.

(57) ABSTRACT

A curable composition for an optical material including a specific silicon-containing polymer (A), a specific epoxy resin (B) and an energy ray-sensitive cationic polymerization initiator (C) as essential components.

23 Claims, 1 Drawing Sheet

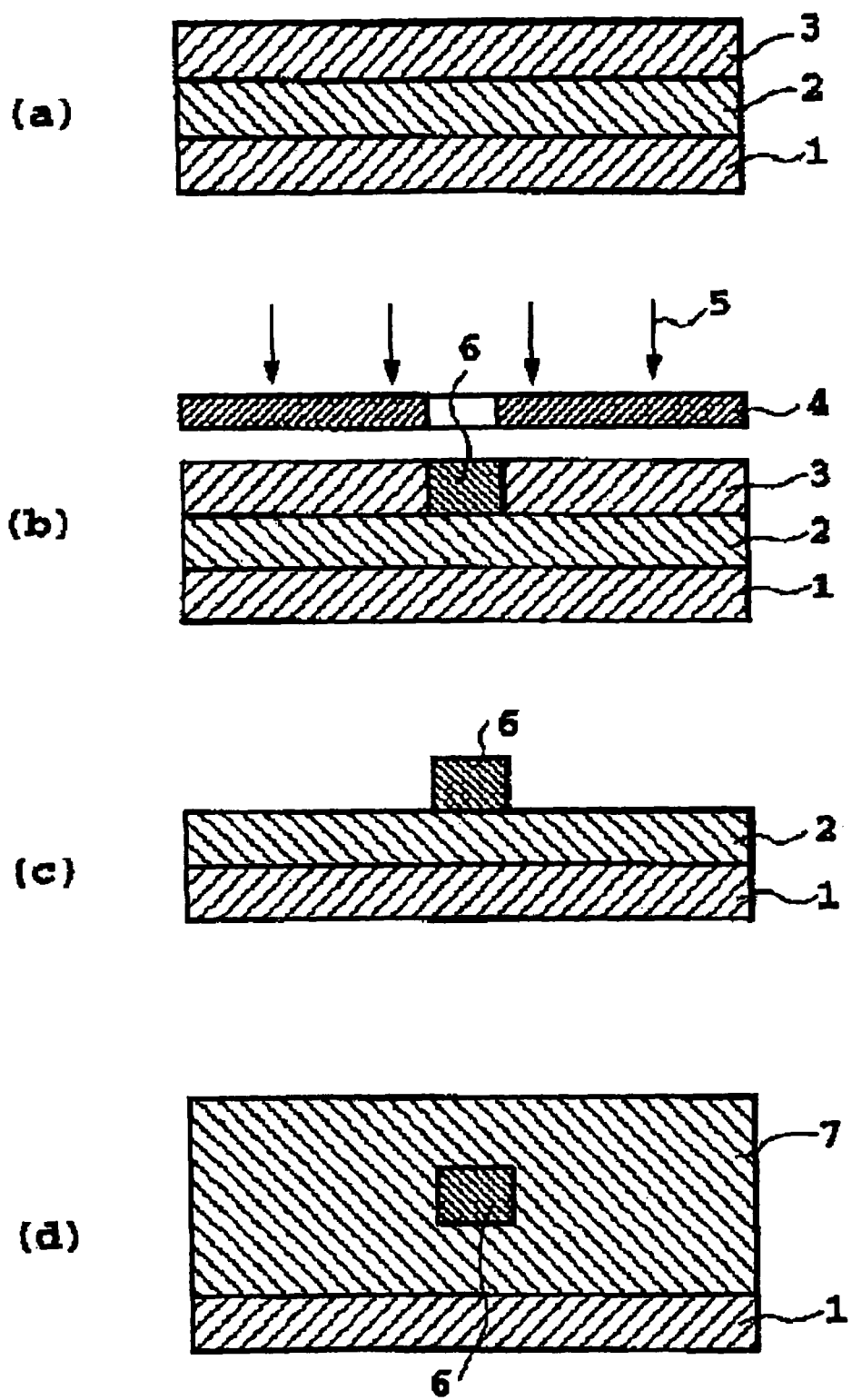

CURABLE COMPOSITION FOR OPTICAL MATERIAL AND OPTICAL WAVEGUIDE

TECHNICAL FIELD

The present invention relates to a curable composition for an optical material, and more specifically, to a curable composition for an optical material that can be utilized in, for example, any one of various optical elements, optical integrated circuits, optical patchboards, and optical waveguides, and an optical waveguide provided with a part obtained by curing the composition.

BACKGROUND ART

An optical waveguide is, for example, a special optical part that performs the multiplexing, branching, switching and the like of light by producing a portion having a slightly higher refractive index than that of surroundings on or directly below the surface of a substrate to confine light. Specific examples of the optical waveguide include optical multiplexing/branching circuits, frequency filters, optical switches, and optical interconnection parts useful in the fields of communication and optical information processing. For example, a WDM (Wavelength Division Multiplexing) system that transmits time-shared signals at different wavelengths is a promising system capable of realizing high-speed, large-capacity communication needed in an altitude information-oriented society. Key optical devices in the WDM system are, for example, a light source, an optical amplifier, an optical multiplexing/branching device, an optical switch, a tunable filter, and a wavelength converter.

An optical waveguide device has, for example, the advantages that the device can realize sophisticated functions in a compact space on the basis of a precisely designed waveguide circuit as compared to an optical fiber part, can be put into volume production, and can integrate many kinds of optical waveguides in one chip.

Inorganic glass excellent in transparency and having small optical anisotropy has been heretofore mainly used as a material for an optical waveguide. However, the inorganic glass involves, for example, the problems that the glass is heavy, is apt to break, and requires a high production cost. Recently, there has been an active move toward the production of an optical waveguide part with a polymer material showing transparency in a visible light region below, for example, 0.85 μm or, at communication wavelengths in the range of, for example, 1.3 to 1.55 μm corresponding to an infrared region instead of the inorganic glass.

For example, Patent Document 1 discloses a curable composition for an optical material characterized in that the curable composition contains a silicon containing polymer having an epoxy group, a silicon atom having at least three oxygen atoms bonded to itself, a Si—R group (where R represents an alkyl group, phenyl group, alkylphenyl group or phenylyalkyl group, or an alkyl group, phenyl group, alkylphenyl group or phenylyalkyl group in which part or all of the hydrogen atoms in the R group are substituted with halogen or deuterium atom) and no Si—OH group and having a weight average molecular weight of from 500 to 1,000,000, and a curing catalyst as essential components; and a optical waveguide obtained by curing the curable composition.
Patent Document 1: JP-A-2004-10849, Claims

DISCLOSURE OF THE INVENTION

Problems to be Solved by the Invention

The curable composition for an optical material using a silicon-containing polymer having an epoxy group as a macromonomer as disclosed in Patent Document 1 is excellent in, for example, heat resistance and transparency (low optical loss property) at a communication wavelength, and has some degree of moisture resistance, but optical waveguides have been produced in recent years at a higher temperature and a higher humidity than those in the production of a conventional optical waveguide, so the above moisture resistance no longer suffices for the production of an optical waveguide under such conditions.

Therefore, an object of the present invention is to provide a curable composition for an optical material which simultaneously satisfies heat resistance, moisture resistance, and transparency (low optical loss property) at a communication wavelength and serves as an excellent material particularly for an optical waveguide, and an optical waveguide provided with a member obtained by curing the composition.

Means for Solving the Problems

The present inventors have made extensive studies. As a result, the inventors have been able to solve the above problems, and complete the present invention.

That is, the present invention provides a curable composition for an optical material including as essential components:

(A): a silicon-containing polymer having an epoxy group, containing a silicon atom having at least three oxygen atoms bonded thereto the silicon atom, having an Si—R group where R represents an alkyl group, a phenyl group, an alkylphenyl group, or a phenylalkyl group, or an alkyl group, phenyl group, alkylphenyl group, or phenylalkyl group in which some or all hydrogen atoms are substituted with a halogen or deuterium atom and an Si—OR' group where R' represents an alkyl group, a phenyl group, an alkylphenyl group, or a phenylalkyl group, or an alkyl group, phenyl group, alkylphenyl group, or phenylalkyl group in which some or all hydrogen atoms are substituted with a halogen or deuterium atom, and having a weight average molecular weight of 1,000 to 1,000,000;

(B): an epoxy resin represented by the following general formula (1):

[Chem 1]

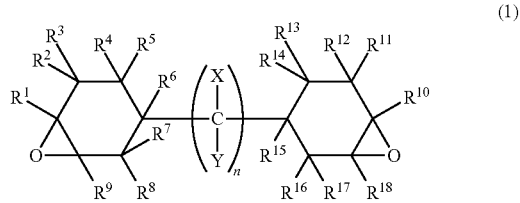

(1)

where X and Y may be identical to or different from each other, and each represent a monovalent group selected from a hydrogen atom, an alkyl group, a fluoroalkyl group, a perfluoroalkyl group, a phenyl group, an alkylphenyl group, a fluorophenyl group, a perfluorophenyl group, a fluoroalkylphenyl group, and a perfluoroalkylphenyl group, n represents a positive number, and $R^1$ to $R^{18}$ each represent a hydrogen atom, a halogen atom, a hydrocarbon group which may contain an oxygen atom or a halogen atom, or an alkoxy group which may have a substituent; and (C): an energy ray-sensitive cationic polymerization initiator.

In addition, the curable composition for an optical material of the present invention may include (D): an epoxy resin represented by the following general formula (2):

[Chem 2]

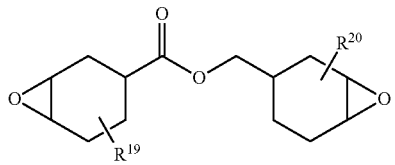

(2)

where $R^{19}$ and $R^{20}$ may be identical to or different from each other, and each represent hydrogen or an alkyl group having 1 to 4 carbon atoms.

Further, the present invention relates to an optical waveguide characterized by including a core formed by curing the above curable composition for an optical material.

Further, the present invention relates to the optical waveguide further including a clad formed by curing the above curable composition for an optical material.

In addition, the present invention relates to a method of producing an optical waveguide including the step of curing the above curable composition for an optical material to form a core.

In addition, the present invention relates to the above method of producing an optical waveguide further including the step of curing the above curable composition for an optical material to form a clad.

Effects of the Invention

An effect of the present invention lies in the fact that a curable composition for an optical material which: simultaneously satisfies heat resistance, moisture resistance, and transparency (low optical loss property) at a communication wavelength; and serves as an excellent material particularly for an optical waveguide, and an optical waveguide provided with a part obtained by curing the composition are provided.

BRIEF DESCRIPTION OF THE DRAWINGS

FIG. 1 (a) to (d) are each an outline sectional view showing a step of forming an optical waveguide of the present invention.

BEST MODE FOR CARRYING OUT THE INVENTION

Component (A)

Silicon-Containing Polymer

First, a silicon-containing polymer as an essential component (A) of a curable composition for an optical material of the present invention will be described.

The silicon-containing polymer to be used in the curable composition for an optical material of the present invention has, in its structure, an epoxy group and a silicon atom bonded to at least three oxygen atoms.

Further, the silicon-containing polymer to be used in the present invention has, in its structure, an Si—R group, and R represents an alkyl group, a phenyl group, an alkylphenyl group, or a phenylalkyl group, or an alkyl group, phenyl group, alkylphenyl group, or phenylalkyl group in which part or all of the hydrogen atoms are substituted with a halogen or deuterium atom.

Here, part or all of the hydrogen atoms in R are each preferably substituted with a halogen or deuterium in terms of transparency in a near infrared region. The halogen is preferably fluorine. Specific preferable examples of such group in which part or all of the hydrogen atoms are each substituted with fluorine include a 3,3,3-trifluoropropyl group and a pentafluorophenyl group. A group in which part or all of the hydrogen atoms are substituted with a halogen or deuterium atom is preferably a deuterated phenyl group.

In addition, the silicon-containing polymer to be used in the present invention has, in its structure, an Si—OR' group, and R' represents an alkyl group, a phenyl group, an alkylphenyl group, or a phenylalkyl group, or an alkyl group, phenyl group, alkylphenyl group, or phenylalkyl group in which part or all of the hydrogen atoms are substituted with a halogen or deuterium atom.

It should be noted that the silicon-containing polymer to be used in the present invention has a weight average molecular weight in terms of polystyrene in the range of 1,000 to 1,000,000, or preferably 1,000 to 500,000. Here, a weight average molecular weight of the silicon-containing polymer of less than 1,000 is not preferable because the desired physical property cannot be obtained (the thermal weight loss temperature of the curable composition reduces). A weight average molecular weight of the polymer of more than 1,000,000 is not preferable either because sufficient physical properties cannot be obtained (light scattering occurs in the curable composition, the composition has so high a viscosity as to become difficult to handle, and the productivity of the polymer reduces).

The epoxy equivalent of the silicon-containing polymer to be used in the curable composition for an optical material of the present invention (value obtained by dividing the molecular weight by the number of epoxy groups) is preferably, but not particularly limited to, 100 to 2,000.

In addition, the silicon-containing polymer to be used in the curable composition for an optical material of the present invention may contain one, two or more kinds of atoms selected from the group consisting of boron, magnesium, aluminum, phosphorus, titanium, iron, zirconium, niobium, tin, tellurium, tantalum, and germanium as atoms except silicon; out of these atoms, boron, aluminum, phosphorus, titanium, zirconium, tin, and germanium are particularly preferable. The following procedure suffices for the introduction of any one of those atoms: a hydrolysis/condensation reaction is performed by using an alkoxysilane or a chlorosilane and an alcoholate of any other atom in combination, or the alkoxysilane or the chlorosilane is treated with a complex of the other atom.

Method of introducing an epoxy group into a silicon-containing polymer
<Hydrolysis/Condensation Reaction>

An epoxy group can be introduced into the silicon-containing polymer by the hydrolysis/condensation reaction of the molecules of an alkoxysilane having an epoxy group and/or a chlorosilane having an epoxy group.

<Hydrosilylation Reaction>

An epoxy group can be introduced into the silicon-containing polymer by a hydrosilylation reaction between an alkoxysilane having a silane group (Si—H) and/or a chlorosilane having a silane group (Si—H), or a polymer of at least one kind of them and an epoxy compound having a vinyl group (such as vinylcyclohexene oxide). Alternatively, an epoxy group can be introduced into the silicon-containing polymer also by a hydrosilylation reaction between an alkoxysilane having a vinyl group (—CH=CH$_2$) and/or a chlorosilane having a vinyl group (—CH=CH$_2$), or a polymer of at least one kind of them and an epoxy compound having a silane group (Si—H).

To be more specific, a polymer obtained by the hydrolysis/condensation reaction of the molecules of the alkoxysilane having a silane group (Si—H) and/or of the chlorosilane having a silane group (Si—H) and the epoxy compound having a vinyl group are preferably subjected to a hydrosilylation reaction. Alternatively, an epoxy group can be introduced into the silicon-containing polymer by subjecting a polymer obtained by the hydrolysis/condensation reaction of the molecules of the alkoxysilane having a vinyl group (—CH=CH$_2$) and/or the chlorosilane having a vinyl group (—CH=CH$_2$) and the epoxy compound having a silane group (such as glycidoxydimethylsilane) to a hydrosilylation reaction.

It should be noted that those methods of introducing an epoxy group may each be employed alone, or may be employed in combination.

Method of Producing a Silicon-Containing Polymer

As described above, the silicon-containing polymer as the component (A) to be used in the curable composition for an optical material of the present invention can be produced by causing an alkoxysilane having an epoxy group and/or a chlorosilane having an epoxy group to be present upon hydrolysis/condensation reaction of the molecules of an alkoxysilane and/or a chlorosilane.

In this case, the hydrolysis/condensation reaction may be performed by using only the alkoxysilane having an epoxy group and/or the chlorosilane having an epoxy group; the hydrolysis/condensation reaction is preferably performed by mixing the alkoxysilane and/or the chlorosilane with any other alkoxysilane in terms of physical properties.

In addition, the silicon-containing polymer as the component (A) to be used in the curable composition for an optical material of the present invention can be produced by: causing an alkoxysilane having a silane group and/or a chlorosilane having a silane group to be present upon hydrolysis/condensation reaction of the molecules of an alkoxysilane and/or a chlorosilane to form a polymer having a silane group; and subjecting the polymer and an epoxy compound having a vinyl group (such as vinylcyclohexene oxide) to a hydrosilylation reaction.

Alternatively, the silicon-containing polymer can be produced by: causing an alkoxysilane having a vinyl group and/or a chlorosilane having a vinyl group to be present upon hydrolysis/condensation reaction of the molecules of an alkoxysilane and/or a chlorosilane to form a polymer having a vinyl group; and subjecting the polymer and an epoxy compound having a silane group to a hydrosilylation reaction.

It should be noted that, when the silicon-containing polymer to be used in the curable composition for an optical material of the present invention is obtained by a hydrosilylation reaction between a silane group (Si—H) and a vinyl group (—CH=CH$_2$), the hydrosilylation reaction is desirably performed by using a conventionally known catalyst such as a platinum catalyst.

An epoxy compound to be used for introducing an epoxy group into the silicon-containing polymer by a hydrosilylation reaction has only to be a compound having an epoxy group and a vinyl group, or a compound having an epoxy group and a silane group. Specific examples of such compounds include vinylcyclohexene oxide and glycidoxydimethylsilane.

The hydrolysis/condensation reaction of the molecules of an alkoxysilane for obtaining the silicon-containing polymer to be used in the curable composition for an optical material of the present invention has only to be the so-called sol-gel reaction. A method for the sol-gel reaction is, for example, a method involving performing a hydrolysis/condensation reaction in the absence of a solvent or in a solvent with a catalyst such as an acid or a base. The solvent to be used here is not particularly limited, and specific examples of the solvent include water, methanol, ethanol, n-propanol, isopropanol, n-butanol, isobutanol, t-butanol, acetone, methyl ethyl ketone, dioxane, tetrahydrofuran and toluene. One kind of them can be used, or two or more kinds of them can be used as a mixture.

The above hydrolysis/condensation reaction of the molecules of an alkoxysilane advances via the following mechanism: the molecules of the alkoxysilane produce silanol groups (Si—OH) as a result of hydrolysis with water, and the produced silanol groups, or any one of the silanol groups and an alkoxy group, condense with each other. An appropriate amount of water is preferably added in order for the reaction to advance; water may be added into the solvent, or the catalyst may be dissolved in water before water is added. In addition, the hydrolysis reaction advances also with moisture in the air or a trace amount of moisture in the solvent.

The catalyst such as an acid or a base to be used in the above hydrolysis/condensation reaction is not particularly limited as long as the catalyst promotes the hydrolysis/condensation reaction. Specific examples of the catalyst include: inorganic acids such as hydrochloric acid, phosphoric acid and sulfuric acid; organic acids such as acetic acid, p-toluenesulfonic acid and monoisopropyl phosphate; inorganic bases such as sodium hydroxide, potassium hydroxide, lithium hydroxide and ammonia; amine compounds such as trimethylamine, triethylamine, monoethanolamine and diethanolamine; titanium esters such as tetraisopropyl titanate and tetrabutyl titanate; tin carboxylates such as dibutyltin laurate and tin octylate; boron compounds such as trifluoroboran; chlorides of metals such as iron, cobalt, manganese and zinc, and carboxylates of the metals such as naphthenates and octylates; and aluminum compounds such as aluminum trisacetyl acetate. One kind of them can be used, or two or more kinds of them can be used in combination.

The above hydrolysis/condensation reaction is preferably performed by, for example, the following method: the reaction is advanced under an acidic condition (at a pH of 7 or less) by adding an acid catalyst, and is performed under a basic condition (at a pH of 7 or more) by adding a basic catalyst.

It should be noted that the above hydrolysis/condensation reaction is preferably performed under stirring, and the reaction can be promoted under heat.

The order of the hydrolysis/condensation reaction is not particularly limited. For example, when an alkoxysilane having an epoxy group is used for introducing an epoxy group, a mixture of both the alkoxysilane having an epoxy group and any other alkoxysilane may be subjected to a hydrolysis/condensation reaction. Alternatively, the following procedure may be adopted: the alkoxysilane having an epoxy group alone is subjected to a hydrolysis/condensation reaction to some extent, any other alkoxysilane is added to the resultant, and the mixture is further subjected to a hydrolysis/condensation reaction.

Even when a chlorosilane is used in addition to an alkoxysilane, a hydrolysis/condensation reaction has only to be performed as in the case of the alkoxysilane.

The removal of the reaction solvent, water, and the catalyst suffices for the acquisition of the silicon-containing polymer produced by the hydrolysis/condensation reaction. For example, the following procedure is desirable: the silicon-containing polymer is extracted by adding a solvent such as butanol, and the extracting solvent is removed by distillation under reduced pressure in a stream of nitrogen.

Also, in addition to an alkoxysilane and a chlorosilane, the silicon-containing polymer to be used in the curable composition for an optical material of the present invention can be produced by utilizing silicon dioxide condensate obtained by removing sodium from sodium silicate by ion-exchange or the like and condensing ion-exchanged silicate.

<Alkoxysilane and Chlorosilane>

Alkoxysilane or chlorosilane to be used in the production of the silicon-containing polymer as component (A) which is used in the curable composition for an optical material of the present invention may have, in the molecule, an alkoxy group that undergoes a hydrolysis/condensation reaction, or may have an Si—Cl group. Specific examples include trimethylmethoxy silane, trimethylethoxy silane, dimethyldimethoxy silane, dimethyldiethoxy silane, dimethoxymethyl silane, tetramethoxy silane, tetraethoxy silane, methyltrimethoxy silane, methyltriethoxy silane, methyldimethoxy silane, methyldiethoxy silane, dimethylethoxy silane, dimethylvinylmethoxy silane, dimethylvinylethoxy silane, methylvinyldimethoxy silane, methylvinyldiethoxy silane, diphenyldimethoxy silane, phenyltrimethoxy silane, diphenyldiethoxy silane, phenyltriethoxy silane, vinyltrichlorosilane, vinyltris(βmethoxyethoxy)silane, vinyltriethoxy silane, vinyltrimethoxy silane, γ-(methacryloyloxypropyl)trimethoxy silane, N-β(aminoethyl)γ-aminopropyltrimethoxy silane, N-β(aminoethyl)γ-aminopropylmethyldimethoxy silane, γ-aminopropyltriethoxy silane, chlorinated substance of them in which each alkoxy group is substituted by chlorine, and substances in which a part or all of the hydrogen atoms of a group except an alkoxy group are substituted with a halogen (particularly, fluorine) or deuterium atom. Those may be used alone or in a combination of two or more kinds.

An alkoxysilane or chlorosilane in which part or all of the hydrogen atoms in a group are each substituted with a halogen (especially, fluorine) or deuterium is preferably used particularly in terms of transparency in a near infrared region. Specific examples of such compound to be preferably used include deuterated phenyl trimethoxysilane, pentafluorophenyl triethoxysilane, and (3,3,3-trifluoropropyl)trimethoxysilane. In addition, a compound having a silane group (Si—H), a vinyl group (—CH=CH$_2$) and/or a vinylsilane group (Si—CH=CH$_2$) is preferable in order that an epoxy group may be introduced.

<Alkoxysilane Having Epoxy Group>

The alkoxysilane having an epoxy group to be used for introducing an epoxy group into the silicon-containing polymer to be used in the curable composition for an optical material of the present invention has only to have an epoxy group in any one of its molecules, and specific examples of such alkoxysilane include γ-glycidoxypropyltrimethoxysilane, γ-glycidoxypropylmethyldiethoxysilane, β-(3,4-epoxycyclohexyl)ethyltrimethoxysilane and β-(3,4-epoxycyclohexyl)ethyltriethoxysilane. One or two or more kinds of them can be used.

In the case of an alkoxysilane having a 3,4-epoxycyclohexyl group, a copolymer is preferably obtained by the following procedure from the viewpoint of an increase in thermal weight loss temperature of the curable composition for the optical material: the alkoxysilane is subjected to a hydrolysis reaction under mild conditions (when any other alkoxysilane is also used, the two alkoxysilanes are treated in different kilns, and the alkoxysilane having a 3,4-epoxycyclohexyl group is treated under mild conditions), a reaction liquid is made neutral or alkaline, and then the reaction liquid is subjected to polycondensation under heat.

It should be noted that these epoxy groups are preferably bonded to a silicon atom without involving any oxygen atom. In addition, out of the above specific examples, β-(3,4-epoxycyclohexyl)ethyltrimethoxysilane and β-(3,4-epoxycyclohexyl)ethyltriethoxysilane are particularly preferable in terms of the photo-curing property of the curable composition.

<Chlorosilane Having Epoxy Group>

The chlorosilane having an epoxy group to be used for introducing an epoxy group into the silicon-containing polymer to be used in the curable composition for an optical material of the present invention has only to have an epoxy group in any one of its molecules.

<Treatment with Hydrolyzable Ester Compound>

Alternatively, the following procedure may be adopted: the silicon-containing polymer as the component (A) to be used in the curable composition for an optical material of the present invention, or a solution after the hydrolysis/condensation reaction performed for obtaining the silicon-containing polymer is treated with a chlorosilane compound such as trimethylchlorosilane, or a hydrolyzable ester compound as it is or after having been subjected to a catalyst-removing treatment. The silicon-containing polymer or the solution is particularly preferably treated with the hydrolyzable ester compound so that a silanol group (Si—OH) in the silicon-containing polymer is terminated to provide a Si—OR' group.

Examples of the hydrolyzable ester compound include an orthoformate, an orthoacetate, a tetraalkoxymethane and a carbonate, and one, two or more kinds of them can be used. Among them, a trialkyl orthoformate, a tetraalkoxymethane and the like are particularly preferable.

A method for the treatment with the hydrolyzable ester compound is simple such as that described below. An excess amount of the hydrolyzable ester compound can be added to the silicon-containing polymer, a mixture of the silicon-containing polymer with a solvent, or an optical material composition containing the silicon-containing polymer, and the addition can be preferably carried out under stirring and heat. After the treatment, the resultant may be used as it is, or the unreacted hydrolyzable ester compound may be removed in a stream of nitrogen under heat and reduced pressure. By the removal treatment, a silanol group is absent and the storage stability and transparency of the curable composition can be improved.

The silicon-containing polymer as the component (A) to be used in the curable composition for an optical material of the present invention is preferably such that a ratio of a phenyl group to total organic components (components excluding silicon) is in the range of 85 mass % or less, and a ratio of a methyl group to all the organic components is in the range of 85 mass % or less. As the amount of the phenyl group increases, the curable composition can withstand a higher temperature, but shows a higher viscosity at room temperature, with the result that the ease of handling of the curable composition is reduced. As the polymer contains a larger amount of the methyl group, the viscosity of the curable composition at room temperature is reduced. However, an excessively large amount of a methyl group is not preferable because the heat resistance of the curable composition is reduced.

Further, one or more kinds of the above components can be used as the above component (A).

Component (B)

Epoxy Resin

An epoxy resin as a component (B) to be used in the curable composition for an optical material of the present invention is an epoxy resin represented by the following general formula (1):

[Chem 3]

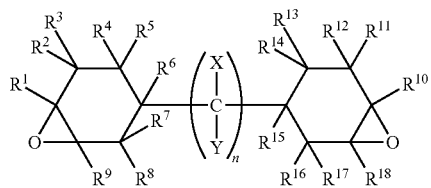

(1)

where X and Y may be identical to or different from each other, and each represent a monovalent group selected from a hydrogen atom, an alkyl group, a fluoroalkyl group, a perfluoroalkyl group, a phenyl group, an alkylphenyl group, a fluorophenyl group, a perfluorophenyl group, a fluoroalkylphenyl group, and a perfluoroalkylphenyl group, n represents a positive number, and $R^1$ to $R^{18}$ each represent a hydrogen atom, a halogen atom, a hydrocarbon group which may contain an oxygen atom or a halogen atom, or an alkoxy group which may have a substituent.

Since the component (B) has a rigid molecular structure, a cured product to be obtained shows a high glass transition point. In addition, the curable composition contracts to a small extent in association with the curing. When the component contains a perfluoro group, the component has a reducing effect on the water absorbing property of the cured product because the component is barely polarizable.

Further, $R^1$ to $R^{18}$ of the component (B) each preferably represent a hydrogen atom. In addition, X and Y each preferably represent a methyl group or a perfluoromethyl group, and n preferably represents a number of 1 to 3.

Specific examples of such preferable compound include 2,2-bis(3,4-epoxycyclohexyl)propane and 1,1,1,3,3,3-hexafluoropropyl-2,2-bis(3,4-epoxycyclohexyl)propane.

Also, one, two or more kinds of compounds can be used as the component (B).

A usage ratio (mass ratio) between the component (A) and the component (B) "(A):(B)" is in the range of preferably 10:90 to 90:10, more preferably 20:80 to 80:20, or still more preferably 40:60 to 60:40.

A component (C) to be used in the curable composition for an optical material of the present invention is an energy ray-sensitive cationic polymerization initiator. That is, the component is a compound capable of emitting a substance that initiates cationic polymerization by being irradiated with an energy ray, and is preferably, but not particularly limited to, a double salt as an onium salt that emits a Lewis acid by being irradiated with an energy ray, or a derivative of the double salt.

A representative example of such compound is a salt consisting of a cation and an anion represented by the following general formula: $[A]^{m+}[B]^{m-}$. Here, the cation $[A]^{m+}$ is preferably an onium, and its structure can be represented by, for example, the following general formula: $[(R^{21})_a Q]^{m+}$. Also, $R^{21}$ represents an organic group the number of carbon atoms of which falls within the range of 1 to 60 and which may contain an arbitrary number of atoms except the carbon atoms. The symbol a represents an integer of 1 to 5 and an number of a $R^{21}$'s are independent of each other, and may be identical to or different from each other. Further, at least one of the a $R^{21}$'s preferably represents such organic group as described above having an aromatic ring. Q represents an atom or atomic group selected from the group consisting of S, N, Se, Te, P, As, Sb, Bi, O, I, Br, Cl, F, and N=N. In addition, when the valence of Q in the cation $[A]^{m+}$ is represented by q, the relationship of m=a−q must be valid (provided that N=N is treated as having a valence of 0).

In addition, the anion $[B]^{m-}$ is preferably a halide complex, and its structure can be represented by, for example, the following general formula: $[LX_b]^{m-}$. Also, L represents a metal or metalloid serving as the central atom of the halide complex, and is, for example, B, P, As, Sb, Fe, Sn, Bi, Al, Ca, In, Ti, Zn, Sc, V, Cr, Mn or Co. X represents a halogen atom. b represents an integer of 3 to 7. In addition, when the valence of L in the anion $[B]^{m-}$ is represented by p, the relationship of m=b−p must be valid.

Specific examples of the anion represented by the above general formula $[LX_b]^{m-}$ include tetrafluoroborate $(BF_4)^-$, hexafluorophosphate $(PF_6)^-$, hexafluoroantimonate $(SbF_6)^-$, hexafluoroarsenate $(AsF_6)^-$ and hexachloroantimonate $(SbCl_6)^-$.

In addition, an anion with a structure represented by $[LX_{b-1}(OH)]^{m-}$ can be preferably used as the anion $B^{m-}$. Also, L, X and b each have the same meaning as that described above. In addition, examples of the other anion that can be used include a perchlorate ion $(ClO_4)^-$, a trifluoromethyl sulfite ion $(CF_3SO_3)^-$, a fluorosulfonate ion $(FSO_3)^-$, a toluenesulfonic acid anion and a trinitrobenzenesulfonic acid anion.

It is particularly effective to use any one of the aromatic onium salts in the following items (i) to (iii) out of such onium salts in the present invention. One kind of them can be used alone, or two or more kinds of them can be used as a mixture:
(i) aryldiazonium salts such as phenyldiazonium hexafluorophosphate, 4-methoxyphenyldiazonium hexafluoroantimonate and 4-methylphenyldiazonium hexafluorophosphate;
(ii) diaryl iodonium salts such as diphenyl iodonium hexafluoroantimonate, di(4-methylphenyl)iodonium hexafluorophosphate and di(4-tert-butylphenyl)iodonium hexafluorophosphate; and
(iii) triaryl sulfonium salts such as triphenylsulfonium hexafluoroantimonate, tris(4-methoxyphenyl)sulfonium hexafluorophosphate, diphenyl-4-thiophenoxyphenyl sulfonium hexafluoroantimonate, diphenyl-4-thiophenoxyphenylsulfonium hexafluorophosphate, 4,4'-bis(diphenylsulfonio)phenylsulfide-bis-hexafluoroantimonate, 4,4'-bis(diphenylsulfonio)phenylsulfide-bis-hexafluorophosphate, 4,4'-bis[di(β-hydroxyethoxy)phenylsulfonio]phenylsulfide-bis-hexafluoroantimonate, 4,4'-bis[di(β-hydroxyethoxy)phenylsulfonio]phenylsulfide-bis-hexafluorophosphate, 4-[4'-(benzoyl)phenylthio]phenyl-di-(4-fluorophenyl)sulfonium hexafluoroantimonate and 4-[4'-(benzoyl)phenylthio]phenyl-di-(4-fluorophenyl)sulfonium hexafluorophosphate.

In addition, other preferable examples include an iron-arene complex such as $(\eta^5$-2,4-cyclopentadiene-1-yl)[(1,2,3, 4,5,6-η)-(1-methylethyl)benzene]-iron-hexafluorophosphate, and a mixture of an aluminium complex such as tris(acetylactonate)aluminium, tris(ethylacetonateacetate)aluminium or tris(salicylaldehydate)aluminium and a silanol such as triphenylsilanol.

Of those, an aromatic iodonium salt, an aromatic sulfonium salt, or an iron-arene complex can be preferably used from the viewpoints of the usefulness and photosensitivity of the curable composition.

Further, the energy ray-sensitive cationic polymerization initiator as the component (C) is blended in an amount of 0.05 to 30 mass %, or preferably 0.5 to 10 mass % with respect to the total mass of the component (A) and the component (B), and, if the curable composition contains a component (D) to be described later, the component (D). When the amount is excessively small, the sensitivity of the curable composition deteriorates. When the amount is excessively large, the curing property of the curable composition deteriorates, and problems such as a reduction in adhesiveness of the curable composition and the coloring of a cured product are apt to occur.

The curable composition for an optical material of the present invention preferably further contains an epoxy resin represented by the following general formula (2) as a component (D):

[Chem 4]

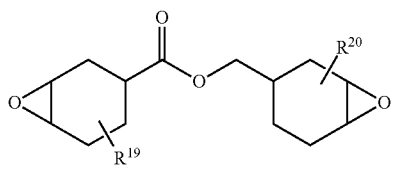

(2)

where $R^{19}$ and $R^{20}$ may be identical to or different from each other, and each represent hydrogen or an alkyl group having 1 to 4 carbon atoms.

$R^{19}$ and $R^{20}$ each preferably represent hydrogen. To be specific, 3,4-epoxycyclohexylmethyl-3,4-epoxycyclohexane carboxylate is preferable.

When the curable composition contains the component (D), it is preferable that a silicon-containing polymer having an additionally high viscosity can be used as the above component (A) since the component (D) can reduce the viscosity of the curable composition at room temperature.

Also, the component (D) is used at a ratio of preferably 10 to 60 parts by mass, or more preferably 15 to 50 parts by mass with respect to 100 parts by mass of the component (A). Here, a ratio at which the component (D) is used of less than 10 parts by mass is not preferable because no effect of adding the component appears, and a ratio at which the component is used in excess of 60 parts by mass is not preferable either because the probability that the process resistance and environment resistance of a cured product formed of the curable composition deteriorate increases.

Solvents, another cationic polymerizable organic substance, acid diffusion control agents, photosensitizers, thermoplastic polymer compounds, fillers or the like, can be added to the curable composition for an optical material of the present invention as desired to such an extent that the effect of the present invention is not impaired, though none of these components is indispensable. Hereinafter, those components will be described.

The solvent is not particularly limited as long as the solvent can dissolve all of the components (A), (B), (C) and (D) described above; a solvent having a boiling point of 80 to 200° C. is recommended.

Specific examples include isopropanol, t-butanol, methylethyl ketone, methylisobutyl ketone, cyclopentanone, cyclohexanone, cycloheptanone, toluene, xylene, chlorobenzene, ethyleneglycol dimethyl ether, ethyleneglycol diethyl ether, diethyleneglycol dimethyl ether, methyl ether, 2-methoxy-2-propanol acetate, methoxy-2-propanol acetate, octamethyl cyclotetrasiloxane and hexamethyl disiloxane. Those organic solvents may be used alone or in a mixture of two or more kinds.

However, when a solvent is used, the performance of the cured product may vary owing to residual solvent. The solvent is blended in an amount of preferably 1 to 1,000 mass %, or more preferably 1 to 500 mass % with respect to the total mass of the components (A) to (D), though the preferable value varies depending on the properties of the solvent, the solubility of each of the components (A) to (D) in the solvent and the viscosity of the solvent.

Examples of other cationic polymerizable organic substances include epoxy compounds [excluding those each corresponding to any one of the component (A), the component (B) and the component (D) described above], oxetane compounds, cyclic ether compounds, cyclic lactone compounds, cyclic thioether compounds, spiro orthoester compounds and vinylether compounds. One, two or more kinds of them can be used. Of those, an epoxy compound is suitable for the substance because of its easy availability and convenience in handling. Examples of such an epoxy compound include aromatic epoxy compounds, alicyclic epoxy compounds, and aliphatic epoxy compounds.

Specific examples of the above aromatic epoxy compound include: polyglycidyl ethers of polyhydric phenols each having at least one aromatic ring, or of alkylene oxide adducts of the phenols such as glycidyl ethers of bisphenol A and bisphenol F, or of compounds obtained by further adding alkylene oxides to bisphenol A and bisphenol F; and epoxy novolak resins.

In addition, specific examples of the above alicyclic epoxy compound include: polyglycidyl ethers of polyhydric alcohols each having at least one alicyclic ring; and cyclohexene oxide- or cyclopentene oxide-containing compounds obtained by epoxidizing cyclohexene ring- or cyclopentene ring-containing compounds with oxidants. Examples include a hydrogenated bisphenol A glycidyl ether, 2-(3,4-epoxycyclohexyl-5,5-spiro-3,4-epoxy)cyclohexane-methadioxane, bis(3,4-epoxycyclohexylmethyl)adipate, vinylcyclohexene dioxide, 4-vinylepoxycyclohexane, bis(3,4-epoxy-6-methylcyclohexylmethyl)adipate, 3,4-epoxy-6-methylcyclohexylcarboxylate, dicyclopentadienediepoxide, ethyleneglycol di(3,4-epoxycyclohexylmethyl)ether, dioctyl epoxyhexahydrophthalate and di-2-ethylhexyl epoxyhexahydrophthalate.

Further, specific examples of the aliphatic epoxy compound include: polyglycidyl ethers of aliphatic polyhydric alcohols and the alkyleneoxide adducts of the aliphatic polyhydric alcohols; polyglycidyl esters of aliphatic long-chain polybasic acid, homopolymers synthesized by the vinyl polymerization of glycidyl acrylate or glycidyl methacrylate, and copolymers synthesized by the vinyl polymerization of glycidyl acrylate and another vinyl polymer. Representative compounds include glycidyl ethers of polyhydric alcohols, such as 1,4-butanediol diglycidyl ether, 1,6-hexanediol diglycidyl ether, triglycidyl ethers of glycerine, triglycidyl ethers of trimethylolpropane, tetraglycidyl ethers of sorbitol, hexaglycidyl ethers of dipentaerythritol, diglycidyl ethers of polyethylene glycol, diglycidyl ethers of polypropyleneglycol, polyglycidyl ethers of polyether polyol obtained by adding one, two or more kinds of alkyleneoxides with an aliphaticpolyhydric alcohol such as propyleneglycol, trimethylol propane or glycerine, and diglycidyl esters of aliphatic long-chain dibasic acids. In addition, monoglycidyl ethers of aliphatic higher alcohols, phenol, cresol, butylphenol, monoglycidyl ethers of polyether alcohols obtained by adding alkyleneoxide to them, glycidyl esters of higher aliphatic acids, epoxidized soy-bean oil, octyl epoxystarate, butyl epoxystearate, epoxidized linseed oil, epoxidized polybutadiene, and the like are exemplified.

As specific examples other than the epoxy compounds, oxetane compounds such as trimethylene oxide, 3,3-dimethyl oxetane and 3,3-dichloromethyl oxetane, trioxanes such as tetrahydrofuran and 2,3-dimethyltetrahydrofuran, cyclic ether compounds such as 1,3-dioxolane and 1,3,6-trioxacyclooctane, cyclic lactone compounds such as β-propiolactone, γ-butyrolactone and ε-caprolactone, thiirane compounds such as ethylene sulfide, thiethane compounds such as trimethylene sulfide and 3,3-dimethylthiethane, cyclic thioether compounds such as tetrahydrothiophene derivatives, spiro ortho ester compounds obtained by a reaction of an epoxy compound and lactone, and vinyl ether compounds such as ethyleneglycol divinyl ether, alkylvinyl ether, 3,4-dihydropyran-2-methyl(3,4-dihydropyran-2-methyl(3,4-dihydrpyrane-2-carboxylate) and triethyleneglycol divinyl ether may be mentioned. The other cationic polymerizable organic substance is blended in an amount of preferably 0.01 to 10 mass %, or more preferably 0.1 to 5 mass % with respect to the total mass of the components (A) to (D).

The acid diffusion control agent is a compound having the following actions: the agent controls the diffusion of an acidic active substance produced from the component (C) by irradiation with an energy ray in a coating film of the curable composition, and controls a curing reaction in a region where the curable composition is not irradiated with the energy ray.

The acid diffusion control agent is preferably, for example, a nitrogen-containing compound the basicity of which does not change owing to exposure or heat treatment during the step of forming a cured product from the curable composition. Examples of such compound include: nitrogen-containing compounds containing one nitrogen atom in any one of its molecules; diamino compounds containing two nitrogen atoms in one molecule; diamino polymers having three or more nitrogen atoms; amide group-containing compounds; urea compounds; and nitrogen-containing heterocyclic compounds.

Specific examples of such compound include monoalkylamines such as n-hexylamine, n-heptylamine and n-octylamine; dialkylamines such as di-n-butylamine, di-n-hexylamine and di-n-octylamine; trialkylamines such as tri-n-propylamine, tri-n-hexylamine and tri-n-nonylamine; and aromatic amines such as 4-nitroaniline and diphenylamine.

The acid diffusion control agent is blended in an amount of preferably 0.001 to 10 mass %, or more preferably 0.001 to 5 mass % with respect to the total mass of the components (A) to (D).

Representative examples of the thermoplastic polymer compound include polyester, polyvinyl acetate, polyvinyl chloride, polybutadiene, polycarbonate, polystyrene, polyvinyl ether, polyvinyl butyral, polyacrylate, polymethyl methacrylate, polybutene and a hydrogenated product of a styrene-butadiene block copolymer.

In addition, a compound obtained by introducing a functional group such as a hydroxyl group, a carboxyl group, a vinyl group or an epoxy group into any such thermoplastic polymer compound can also be used.

Such thermoplastic polymer compound has a number average molecular weight of preferably 1,000 to 500,000, or more preferably 5,000 to 100,000.

The thermoplastic polymer compound is blended in an amount of preferably 1 to 100 mass %, or more preferably 1 to 10 mass % with respect to the total mass of the components (A) to (D).

Representative examples of the photosensitizer include photosensitizers such as anthracene derivatives and pyrene derivatives. The combined use of any such photosensitizer with the components (A) to (D) increases the rate at which the curable composition for an optical material cures as compared to that in the case where none of the photosensitizers is blended, whereby the curable composition for an optical material becomes a preferable one. The photosensitizer has only to be blended in an amount of about 0.1 to 300 mass % with respect to the mass of the component (C).

Examples of the filler include inorganic or organic, powdery, flaky or fibrous substances. An inorganic filler is, for example, glass powder, mica powder, silica or quartz powder, carbon powder, calcium carbonate powder, alumina powder, aluminum hydroxide powder, aluminum silicate powder, zirconium silicate powder, iron oxide powder, barium sulfate powder, kaolin, dolomite, metal powder, glass fiber, carbon fiber, metal whiskers, calcium carbonate whiskers or hollow glass balloons, or a product obtained by treating the surface of any one of these fillers with a coupling agent to attach an organic group to the surface.

An organic filler is, for example, pulp powder, nylon powder, polyethylene powder, crosslinked polystyrene powder, crosslinked acrylic resin powder, crosslinked phenol resin powder, crosslinked urea resin powder, crosslinked melamine resin powder, crosslinked epoxy resin powder or rubber powder, or a product obtained by attaching a reactive group such as an epoxy group, an acrylic group or a hydroxyl group to the surface of any one of these fillers.

The filler is blended in an amount of about 0.5 to 30 mass %, or preferably about 1 to 20 mass % with respect to the total amount of the components (A) to (D).

In addition, for example, any one of various resin additives such as heat-sensitive cationic polymerization initiators, colorants such as pigments or dyes, leveling agents, defoaming agents, thickeners, flame retardants, antioxidants and stabilizers can be added at an ordinary usage level to the curable composition as desired to such an extent that the effect of the present invention is not impaired.

<Treatment with Active Deuteride>

In addition, in the present invention, the respective components (A) to (D) and any other arbitrary component to be used in the curable composition for an optical material of the present invention are each preferably treated with an active deuteride.

The treatment with the active deuteride can substitute H of, for example, a C—H bond or an O—H bond present in the silicon-containing polymer or in the curable composition for an optical material, the H being responsible for the loss of the transparency of the curable composition in a near infrared region, with deuterium, and can improve the transparency of the curable composition.

It should be noted that examples of the active deuteride include heavy water, and deuterated alcohols such as deuterated methanol and deuterated ethanol.

In addition, the curable composition for an optical material of the present invention may be prepared by known steps, and can be prepared by, for example, sufficiently mixing the materials of which the curable composition is constituted. A specific method for the mixing is, for example, a stirring method involving the utilization of a stirring force in association with the rotation of a propeller, a roll kneading method, or a planetary stirring method. After the mixing, the mixture is passed through a filter having an aperture of 0.1 to 5.0 μm so that the curable composition is prepared.

As an active energy ray for curing the curable composition for an optical material of the present invention, for example, ultraviolet light, electron beams, X-rays, radioactive rays or high-frequency waves may be illustrated, and of those, ultraviolet light is most preferable in terms of economical efficiency. As a light source for ultraviolet light, for example, ultraviolet lasers, mercury lamps, high-pressure mercury lamps, xenon lamps, sodium lamps or alkali metal lamps may be illustrated.

The curable composition for an optical material of the present invention can be utilized in, for example, any one of various optical parts, optical integrated circuits, optical patchboards and optical waveguides.

Next, an optical waveguide of the present invention and a method of producing an optical waveguide of the present invention will be described.

In the optical waveguide of the present invention, at least the core is formed of the curable composition for an optical material of the present invention. Also, in the optical waveguide, the clad can be formed of the curable composition for an optical material of the present invention. When the curable composition for an optical material of the present invention is used in each of both the core and the clad, the following procedure may be desirably adopted: the refractive indices of the curable compositions are measured in advance, and the curable composition having the higher refractive index and the curable composition having the lower refractive index are used in the core and the clad, respectively.

Next, the method of producing an optical waveguide of the present invention will be described.

The method of producing an optical waveguide of the present invention includes the step of curing the curable composition for an optical material of the present invention to form a core. In addition, the method may include the step of curing the curable composition for an optical material of the present invention to form a clad.

For example, the following procedure is desirably adopted. The curable composition for an optical material of the present invention (such as a UV curable composition) is applied to a substrate and cured so that a clad is formed. The curable composition for an optical material of the present invention (such as a UV curable composition) is further applied onto the resultant clad, is aligned with the clad (preferably aligned by using a mask aligner), and is irradiated with ultraviolet light through a mask or directly. Then, a non-irradiated portion is removed with a solvent so that a waveguide ridge pattern is produced. Further, the curable composition for an optical material to serve as a clad material is supplied to the pattern, and is cured so that an optical waveguide is produced. Although description has been made here by taking the case where the curable composition for an optical material of the present invention is used in each of both the core and the clad as an example, the following procedure can also be adopted: the curable composition for an optical material of the present invention is used only in the core, and a common material is used in the clad.

An example of the method of producing an optical waveguide will be specifically described. FIGS. 1(a) to (d) are each an outline sectional view showing a step of forming the optical waveguide according to the present invention.

As shown in FIG. 1(a), a layer (2) of a curable composition (such as a UV curable composition) for the formation of a clad portion is formed on a substrate (1) so as to have a desired thickness. A layer (3) of a curable composition (such as a UV curable composition) for the formation of a core portion is formed on the layer (2) so as to have a desired thickness. Subsequently, as shown in FIG. 1(b), the upper portion of the layer (3) of a curable composition for the formation of a core portion is coated with a mask (4) having a pattern mask with a core portion shape, and the layer (3) is irradiated with ultraviolet light (5) through the mask (4). Thus, only a core portion (6) of the layer (3) of a curable composition for the formation of a core portion is cured. After that, the portion of the layer (3) of a curable composition for the formation of a core portion not irradiated with ultraviolet light is dissolved and removed with a solvent, whereby such ridge pattern of the core portion (6) as shown in FIG. 1(c) is formed. The layer (2) of a curable composition for the formation of a clad portion is applied so as to have such a desired thickness that the core portion (6) is embedded in the layer. Thus, a clad portion (7) shown in FIG. 1(d) can be formed.

Since an optical waveguide with the substrate thus produced uses the curable composition for an optical material of the present invention as a material for a core, and, furthermore, for a clad, the optical waveguide is excellent in solvent resistance. In addition, since the material used has small birefringence, there is little dependence on polarization and further shows it low optical loss, and has excellent heat and moisture resistance.

It is preferable that the substrate to be used in the production of the optical waveguide does not peel in a preliminary step of turning the substrate into a film. Specific examples of the substrate to be used in the production of the optical waveguide include, but are not particularly limited to, glass substrates, Si substrates, sintered Si substrates, PET film, polycarbonates, ceramics, epoxy substrates, polyimide substrates, fluoridated polyimide substrates, FR4 substrates, and products obtained by treating the surface of any one of these substrates physically or chemically with a coupling agent or the like to change adhesiveness of a substrate surface.

One or two kinds of substrates may be used, or a substrate obtained by laminating two or more kinds of materials may be used. The substrate preferably has a smooth surface and high adhesiveness with a material for the optical waveguide. To be specific, a product obtained by applying a novolak type epoxy resin onto a calcined substrate and curing the resin is preferably used.

Although a method of applying the curable composition for an optical material of the present invention onto a substrate or a clad so that the curable composition has a uniform thickness is not particularly limited, the application can be performed by employing, for example, spin coater methods, bar coater methods, solvent cast methods or ink-jet methods; a spin coater is preferably used because the curable composition can be uniformly applied with the spin coater within a short time period.

In addition, when the curable composition for an optical material of the present invention is a UV curable composition, a high-pressure mercury lamp is preferably used as an ultraviolet light source. The amount of ultraviolet light with which the curable composition is irradiated is preferably in the range of 100 to 10,000 mJ/cm$^2$, though the optimum condition for the amount varies depending on the applied thickness of the curable composition.

When the curable composition for an optical material of the present invention is molded into an optical waveguide, the curable composition may be heated as required. An operation for the heating can be performed with, for example, a hot plate or an oven, though a device for the heating is not particularly limited. Of those, an oven is preferably used because heat can be uniformly applied to the curable composition with the oven.

Further, a solvent to be used for forming a core ridge upon production of the above optical waveguide is not particularly limited as long as the solvent dissolves the above components (A) to (D). Concrete examples of such solvent include an alkaline aqueous solution, an acid aqueous solution, acetone, methyl ethyl ketone, methyl isobutyl ketone, ethanol, isopropanol, n-propanol, benzene, toluene, o-xylene, m-xylene, p-xylene and 1,3,4-trimethylbenzene. It is sufficient that one, two or more kinds of them be used. Alternatively, a product obtained by mixing two or more kinds of them at an arbitrary ratio may also be used.

In addition, when an optical waveguide is formed by using the curable composition for an optical material of the present invention, there is no need to employ a development method based on a solvent. That is, a casting mold that can be peeled from a molded product after curing may be used in the formation of a waveguide ridge pattern. Silicon containing compounds, fluorine compounds or glass, or products obtained by treating the surface of any one of them with a coupling agent or the like can be used as the mold. These materials are preferably subjected to mold forming with light.

EXAMPLES

The present invention will be described below in more detail by way of examples. However, the present invention should not be construed as being limited to these examples.

Components described in the examples are as shown below.

The following components (A1) to (A6) were each used as the component (A).

(A1): Silicon-Containing Polymer Synthesized in Accordance with the Following Procedure Reaction vessel 1: 178.5 g (0.90 mol) of phenyl trimethoxysilane and 97.2 g of a 0.032% aqueous solution of phosphoric acid were mixed, the mixture was stirred at 10° C. for 2 hours and then 6.07 g of a 0.5 N aqueous solution of sodium hydroxide were added to the mixture.

Reaction vessel 2: 24.6 g (0.10 mol) of 3,4-epoxycyclohexylethyltrimethoxysilane and 10.8 g of ethanol were mixed, and then 10.8 g of a 0.032% aqueous solution of phosphoric acid were carefully dropped into the reaction liquid over 5 minutes so that the temperature of the reaction liquid might not exceed 10° C., and the mixture was stirred at 10° C. or lower for 2 hours. After that, 0.67 g of a 0.5 N aqueous solution of sodium hydroxide was added to the mixture.

The reaction liquids in the reaction vessels 1 and 2 described above were mixed. Further, 600 ml of toluene and 600 ml of ethanol were added to the mixture, and the temperature of the external bath was increased to 130° C. The whole was subjected to condensation polymerization under heat while water was removed by azeotropy until the silicon-containing polymer to be obtained had a weight average molecular weight Mw of 1,400 (analyzed by GPC, a value in terms of polystyrene). 890 g (6.0 mol) of triethyl orthoformate were added to the silicon-containing polymer, and the mixture was heated to 130° C. After the temperature of the mixture had reached 130° C., the mixture was stirred under heat for 1 hour. 45 g of an adsorbent (Kyoward 600S manufactured by Kyowa Chemical Industry Co., Ltd., the same holds true for the following description) were added to the mixture, and the whole was stirred under heat at 100° C. for 1 hour. After the adsorbent had been removed by filtration, volatile components were removed from the resultant at 120° C. and 3 mmHg, and 45 g of toluene and 1,000 g of methanol were added to the remainder so that the remainder was separated into two layers.

Volatile components were removed from the lower layer at 110° C. and 3 mmHg, and the resultant silicon-containing polymer was represented by (A1). Analysis by GPC showed that the polymer had a weight average molecular weight of 1,800 and analysis by $^1$H-NMR showed that no silanol group (Si—OH) was detected from the polymer.

In addition, analysis by $^1$H-NMR and infrared absorption spectrum confirmed that the polymer had an epoxy group. Analysis by $^{29}$Si-NMR confirmed that the polymer had a silicon atom having at least three oxygen atoms bonded to the silicon atom. Analysis by $^1$H-NMR confirmed that the polymer had an Si—R group. Analysis by $^1$H-NMR and $^{29}$Si-NMR confirmed that the polymer had an Si—OR' group. In addition, the content of a phenyl group in the organic components of the polymer excluding a silicon atom was 65.0 mass %, the content of a methyl group in the organic components excluding a silicon atom was 0 mass %, and the polymer had an epoxy equivalent measured by a potential difference method of 1,428.

(A2): Silicon-Containing Polymer Synthesized in Accordance with the Following Procedure Reaction vessel 1: 300.1 g (1.51 mol) of phenyl trimethoxysilane and 163.7 g of a 0.032% aqueous solution of phosphoric acid were mixed, the mixture was stirred at 10° C. for 2 hours, and then 10.67 g of a 0.5 N aqueous solution of sodium hydroxide were added to the mixture.

Reaction vessel 2: 124.4 g (0.50 mol) of 3,4-epoxycyclohexylethyltrimethoxysilane and 54.7 g of ethanol were mixed, and then 54.7 g of a 0.032% aqueous solution of phosphoric acid were carefully dropped into the reaction liquid over 5 minutes so that the temperature of the reaction liquid might not exceed 10° C., and the mixture was stirred at 10° C. or lower for 2 hours. After that, 3.42 g of a 0.5 N aqueous solution of sodium hydroxide was added to the mixture. The reaction liquids in the reaction vessels 1 and 2 described above were mixed. Further, 1,200 ml of toluene and 1,200 ml of ethanol were added to the mixture, and the temperature of the external bath was increased to 130° C.

The whole was subjected to condensation polymerization under heat while water was removed by azeotropy until a silicon-containing polymer to be obtained had a weight average molecular weight Mw of 2,200. 1,780 g (12.0 mol) of triethyl orthoformate were added to the silicon-containing polymer, and the mixture was heated to 130° C. After the temperature of the mixture had reached 130° C., the mixture was stirred under heat for 1 hour.

90 g of an adsorbent were added to the mixture, and the whole was stirred under heat at 100° C. for 1 hour. After the adsorbent had been removed by filtration, volatile components were removed from the resultant at 120° C. and 3 mmHg, and 45 g of toluene and 1,000 g of methanol were added to the remainder so that the remainder was separated into two layers.

Volatile components were removed from the lower layer at 110° C. and 3 mmHg, and the resultant silicon-containing polymer was represented by (A2). Analysis by GPC showed that the polymer had a weight average molecular weight of 1,800 and analysis by $^1$H-NMR showed that no silanol group (Si—OH) was detected from the polymer.

In addition, analysis by $^1$H-NMR and an infrared absorption spectrum confirmed that the polymer had an epoxy group. Analysis by $^{29}$Si-NMR confirmed that the polymer had a silicon atom having at least three oxygen atoms bonded to the silicon atom. Analysis by $^1$H-NMR confirmed that the polymer had an Si—R group. Analysis by $^1$H-NMR and $^{29}$Si-NMR confirmed that the polymer had an Si—OR' group. In addition, the content of a phenyl group in the organic components of the polymer excluding a silicon atom was 50.8 mass %, the content of a methyl group in the organic components excluding a silicon atom was 0 mass %, and the polymer had an epoxy equivalent measured by a potential difference method of 600.

(A3): Silicon-Containing Polymer Synthesized in Accordance with the Following Procedure Reaction vessel 1: 138.8 g (0.70 mol) of phenyltrimethoxysilane, 6.0 g (0.05 mol) of dimethyldimethoxy silane, 23.6 g (0.10 mol) of γ-glycidoxypropyltrimethoxysilane and 91.8 g of a 0.032% aqueous solution of phosphoric acid were mixed, the mixture was stirred at 10° C. for 2 hours, and then 5.74 g of a 0.5 N aqueous solution of sodium hydroxide were added to the mixture.

Reaction vessel 2: 37.0 g (0.15 mol) of 3,4-epoxycyclohexylethyltrimethoxysilane and 16.2 g of ethanol were mixed, and then 16.2 g of a 0.032% aqueous solution of phosphoric acid were carefully dropped into the reaction liquid over 5 minutes so that the temperature of the reaction liquid might not exceed 10° C., and the mixture was stirred at 10° C. or lower for 2 hours. After that, 1.01 g of a 0.5 N aqueous solution of sodium hydroxide was added to the mixture.

The reaction liquids in the reaction vessels 1 and 2 described above were mixed. Further, 600 ml of toluene and 600 ml of ethanol were added to the mixture, the temperature of an external bath was increased to 130° C., and the whole was subjected to condensation polymerization under heat while water was removed by azeotropy until a silicon-containing polymer to be obtained had a weight average molecular weight Mw of 1,700 (analyzed by GPC, a value in terms of polystyrene). 1,780 g (12.0 mol) of triethyl orthoformate were added to the silicon-containing polymer, and the mixture was heated to 130° C. After the temperature of the mixture had reached 130° C., the mixture was stirred under heat for 1 hour. 90 g of an adsorbent were added to the mixture, and the whole was stirred under heat at 100° C. for 1 hour. After the adsorbent had been removed by filtration, volatile components were removed from the resultant at 120° C. and 3 mmHg, and 45 g of toluene and 1,000 g of methanol were added to the remainder so that the remainder was separated into two layers. Volatile components were removed from the lower layer at 110° C. and 3 mmHg, and the resultant silicon-containing polymer (200 g) was represented by (A3). Analysis by GPC showed that the polymer had a weight average molecular weight of 2,800, and analysis by $^1$H-NMR showed that no silanol group (Si—OH) was detected from the polymer.

In addition, analysis by $^1$H-NMR and an infrared absorption spectrum confirmed that the polymer had an epoxy group. Analysis by $^{29}$Si-NMR confirmed that the polymer had a silicon atom having at least three oxygen atoms bonded to the silicon atom. Analysis by $^1$H-NMR confirmed that the polymer had an Si—R group. Analysis by $^1$H-NMR and $^{29}$Si-NMR confirmed that the polymer had an Si—OR' group. In addition, the content of a phenyl group in the organic components of the polymer excluding a silicon atom was 49.3 mass %, the content of a methyl group in the organic components excluding a silicon atom was 1.3 mass %, and the polymer had an epoxy equivalent measured by a potential difference method of 584.

(A4): Silicon-Containing Polymer Synthesized in Accordance with the Following Procedure Reaction vessel 1: 119.0 g (0.6 mol) of phenyl trimethoxysilane, 48.1 g (0.4 mol) of dimethyldimethoxy silane and 108.0 g of a 0.032% aqueous solution of phosphoric acid were mixed, the mixture was stirred at 10° C. for 2 hours, and then 6.06 g of a 0.5 N aqueous solution of sodium hydroxide were added to the mixture.

Reaction vessel 2: 246.4 g (1.00 mol) of 3,4-epoxycyclohexylethyltrimethoxysilane and 108.0 g of ethanol were mixed. Then, 108.0 g of a 0.032% aqueous solution of phosphoric acid were carefully dropped into the reaction liquid over 5 minutes so that the temperature of the reaction liquid might not exceed 10° C., and the mixture was stirred at 10° C. or lower for 2 hours. After that, 6.06 g of a 0.5 N aqueous solution of sodium hydroxide was added to the mixture.

The reaction liquids in the reaction vessels 1 and 2 described above were mixed. Further, 1,200 ml of toluene and 1,200 ml of ethanol were added to the mixture, the temperature of the external bath was increased to 130° C., and the whole was subjected to polyconodensation while water was removed by azeotropy until a silicon-containing polymer to be obtained had a weight average molecular weight Mw of 9,000 or more. 1,780 g (12 mol) of triethyl orthoformate were added to the silicon-containing polymer, and the mixture was heated to 130° C. After the temperature of the mixture had reached 130° C., the mixture was stirred under heat for 1 hour. 90 g of an adsorbent were added to the mixture, and the whole was stirred under heat at 100° C. for 1 hour. After the adsorbent had been removed by filtration, volatile components were removed from the resultant at 60° C. and 20 mmHg, and 45 g of toluene and 1,000 g of methanol were added to the remainder so that the remainder was separated into two layers. Volatile components were removed from the lower layer at 60° C. and 3 mmHg, and the resultant silicon-containing polymer was represented by (A4). Analysis by GPC showed that the polymer had a weight average molecular weight of 12,000, and analysis by $^1$H-NMR showed that no silanol group (Si—OH) was detected from the polymer.

In addition, analysis by $^1$H-NMR and an infrared absorption spectrum confirmed that the polymer had an epoxy group. Analysis by $^{29}$Si-NMR confirmed that the polymer had a silicon atom having at least three oxygen atoms bonded to the silicon atom. Analysis by $^1$H-NMR confirmed that the polymer had an Si—R group. Analysis by $^1$H-NMR and $^{29}$Si-NMR confirmed that the polymer had an Si—OR' group. In addition, the content of a phenyl group in the organic components of the polymer excluding a silicon atom was 20.3 mass %, the content of a methyl group in the organic components excluding a silicon atom was 5.1 mass %, and the polymer had an epoxy equivalent measured by a potential difference method of 307.

(A5): Silicon-Containing Polymer Synthesized in Accordance with the Following Procedure Reaction vessel 1: 50 g (0.25 mol) of phenyl trimethoxysilane, 121.5 g (1.01 mol) of dimethyldimethoxy silane, 149 g (0.63 mol) of γ-glycidoxypropyltrimethoxysilane and 204.6 g of a 0.032% aqueous solution of phosphoric acid were mixed, the mixture was stirred at 10° C. for 2 hours, and then 4.26 g of a 0.5 N aqueous solution of sodium hydroxide were added to the mixture.

Reaction vessel 2: 155.2 g (0.63 mol) of 3,4-epoxycyclohexylethyltrimethoxysilane and 68.2 g of ethanol were mixed. Then, 68.2 g of a 0.032% aqueous solution of phosphoric acid were carefully dropped into the reaction liquid over 5 minutes so that the temperature of the reaction liquid might not exceed 10° C., and the mixture was stirred at 10° C.

or lower for 2 hours. After that, 12.8 g of a 0.5 N aqueous solution of sodium hydroxide was added to the mixture.

After the reaction liquids in the reaction vessels 1 and 2 described above had been mixed, the mixture was heated to 45° C., and was subjected to polycondensation for about 1.5 hours under stirring. After the reaction liquid had been diluted by adding 356.4 g of toluene, the stirring was stopped, whereby the reaction liquid was separated into two layers. The lower layer containing the larger amount of organic components of the two layers was separated and exploited, and was subjected to reflux dehydration under reduced pressure at 45° C. for about 1 hour. 561 g (3.79 mol) of triethyl orthoformate were added to the resultant, and the mixture was heated to 130° C. After the temperature of the mixture had reached 130° C., the mixture was stirred under heat for 1 hour. The resultant reaction liquid was cooled with air and passed through a deionization filter. After that, volatile components were removed from the resultant at 60° C. and 3 mmHg, 100 g of toluene were added to dissolve the remainder, and 800 g of hexane were added to the solution so that the solution was separated into two layers. Volatile components were removed from the lower layer at 60° C. and 5 mmHg, and the resultant silicon-containing polymer was represented by (A5). Analysis by GPC showed that the polymer had a weight average molecular weight (Mw) of 10,000, and analysis by $^1$H-NMR showed that no silanol group (Si—OH) was detected from the polymer.

In addition, analysis by $^1$H-NMR and an infrared absorption spectrum confirmed that the polymer had an epoxy group. Analysis by $^{29}$Si-NMR confirmed that the polymer had a silicon atom having at least three oxygen atoms bonded to the silicon atom. Analysis by $^1$H-NMR confirmed that the polymer had an Si—R group. Analysis by $^1$H-NMR and $^{29}$Si-NMR confirmed that the polymer had an Si—OR' group. In addition, the content of a phenyl group in the organic components of the polymer excluding a silicon atom was 7.7 mass %, the content of a methyl group in the organic components excluding a silicon atom was 11.9 mass %, and the polymer had an epoxy equivalent measured by a potential difference method of 307.

(A6): Silicon-Containing Polymer Synthesized in Accordance with the Following Procedure Reaction vessel 1: 108.2 g (0.90 mol) of dimethyldimethoxy silane and 97.2 g of a 0.032% aqueous solution of phosphoric acid were mixed, the mixture was stirred at 10° C. for 2 hours, and then 6.07 g of a 0.5 N aqueous solution of sodium hydroxide were added to the mixture.

Reaction vessel 2: 24.6 g (0.10 mol) of 3,4-epoxycyclohexylethyltrimethoxysilane and 10.8 g of ethanol were mixed. Then, 10.8 g of a 0.032% aqueous solution of phosphoric acid were carefully dropped into the reaction liquid over 5 minutes so that the temperature of the reaction liquid might not exceed 10° C., and the mixture was stirred at 10° C. or lower for 2 hours. After that, 0.67 g of a 0.5 N aqueous solution of sodium hydroxide was added to the mixture.

The reaction liquids in the reaction vessels 1 and 2 described above were mixed. Further, 600 ml of toluene and 400 ml of ethanol were added to the mixture, the temperature of the external bath was increased to 130° C., and the whole was subjected to condensation polymerization under heat while water was removed by azeotropy. 1,780 g (12.0 mol) of triethyl orthoformate were added to the silicon-containing polymer, and the mixture was heated to 130° C. After the temperature of the mixture had reached 130° C., the mixture was stirred under heat for 1 hour. 90 g of an adsorbent were added to the mixture, and the whole was stirred under heat at 100° C. for 1 hour. Volatile components were removed from the resultant at 120° C. and 3 mmHg, and 45 g of toluene and 1,000 g of hexane were added to the remainder so that the remainder was separated into two layers. Volatile components were removed from the lower layer at 110° C. and 3 mmHg, and the resultant silicon-containing polymer was represented by (A6). Analysis by GPC showed that the polymer had a weight average molecular weight of 15,000, and analysis by $^1$H-NMR showed that no silanol group (Si—OH) was detected from the polymer.

In addition, analysis by $^1$H-NMR and an infrared absorption spectrum confirmed that the polymer had an epoxy group. Analysis by $^{29}$Si-NMR confirmed that the polymer had a silicon atom having at least three oxygen atoms bonded to the silicon atom. Analysis by $^1$H-NMR confirmed that the polymer had an Si—R group. Analysis by $^1$H-NMR and $^{29}$Si-NMR confirmed that the polymer had an Si—OR' group. In addition, the content of a phenyl group in the organic components of the polymer excluding a silicon atom was 0 mass %, the content of a methyl group in the organic components excluding a silicon atom was 45.8 mass %, and the polymer had an epoxy equivalent measured by a potential difference method of 933.

The following components (B1) and (B2) were each used as the component (B):
(B1): 2,2-bis(3,4-epoxycyclohexyl)propane; and
(B2): 1,1,1,3,3,3-hexafluoropropyl-2,2-bis(3,4-epoxycyclohexyl)propane.

The following component (C1) was used as the component (C):
(C1): bis-[4-(bis(4-butoxyphenyl)sulfonio)phenyl]sulfide hexafluoroantimonate.

The following component (D1) was used as the component (D):
(D1): 3,4-epoxycyclohexylmethyl-3,4-epoxycyclohexane carboxylate.

Examples 1 to 12, and Comparative Examples 1 and 2

The curable composition for an optical material of the present invention and a composition for comparison were obtained by mixing the respective components (A) to (D) obtained in the foregoing at ratios shown in Table-1 (numbers in the table are represented in "part(s) by mass" units).
[Table 1]

TABLE 1

|  |  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Comp. Ex. 1 | Comp. Ex. 2 |
|---|---|---|---|---|---|---|---|---|---|---|---|---|---|---|---|
| Component A | (A1) | 50 |  |  |  |  |  |  |  | 50 | 50 | 25 | 25 | 100 | 70 |
|  | (A2) |  | 50 | 50 |  |  |  |  |  |  |  |  |  |  |  |
|  | (A3) |  |  |  | 50 |  |  |  |  |  |  |  |  |  |  |
|  | (A4) |  |  |  |  | 50 | 50 |  |  |  |  | 25 | 25 |  |  |
|  | (A5) |  |  |  |  |  |  | 50 |  |  |  |  |  |  |  |
|  | (A6) |  |  |  |  |  |  |  | 50 |  |  |  |  |  |  |

TABLE 1-continued

| | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Comp. Ex. 1 | Comp. Ex. 2 |
|---|---|---|---|---|---|---|---|---|---|---|---|---|---|---|---|
| Component B | (B1) | 40 | 50 | 40 | 40 | 50 | 40 | 40 | 40 | | | 40 | | | |
| | (B2) | | | | | | | | | 40 | 50 | | 40 | | |
| Component C | (C1) | 0.3 | 0.2 | 0.3 | 0.3 | 0.2 | 0.3 | 0.3 | 0.3 | 0.3 | 0.3 | 0.3 | 0.3 | 0.3 | 0.3 |
| Component D | (D1) | 10 | | 10 | 10 | | 10 | 10 | 10 | 10 | | 10 | 10 | | 30 |

Examples 13 to 18 and Comparative Example 3

The optical waveguide of the present invention and an optical waveguide for comparison were produced by using the compositions of the examples and the comparative examples shown in Table-1 as core materials and clad materials in combination as shown in Table-2. Each of the resultant optical waveguides was tested for its optical loss, process resistance and environmental resistance. Table-2 shows the results.

<Production of Optical Waveguide>

Each clad material shown in Table-2 (in Example 13, the composition obtained in Example 5) was laminated on a sintered silicon substrate by a spin coating method so as to have a thickness of 30 μm, was irradiated with ultraviolet light having a light quantity of 10 mW/cm² for 200 seconds, and heated at 120° C. for 15 minutes. Subsequently, each core material shown in Table-2 (in Example 13, the composition obtained in Example 2) was laminated on the resultant by a spin coating method so as to have a thickness of 50 μm, and irradiated with ultraviolet light having a light quantity of 10 mW/cm² for 400 seconds by using a negative photomask. After having been heated at 90° C. for 15 minutes with an oven, the resultant was developed with a mixture containing acetone and isopropanol at a mass ratio of 1:1. The resultant was cured under heat at 120° C. for 15 minutes, whereby a pattern having a line width of 50 μm was formed. Further, the same clad material was laminated by a spin coating method so as to have a thickness of 30 μm above the previously formed pattern line, irradiated with ultraviolet light having a light quantity of 10 mW/cm² for 200 seconds, and heated at 120° C. for 15 minutes, whereby an optical waveguide was produced on the silicon substrate.

<Method of Measuring Optical Loss of Optical Waveguide>

The optical transmission loss of the optical waveguide was obtained by subtracting the splicing loss of the optical waveguide from the transmission loss of the optical waveguide measured by a cutback method with an ASE light source provided with an isolator having a wavelength of 850 nm.

<Evaluation of Optical Waveguide for Process Resistance>

Each of the produced optical waveguides was comprehensively evaluated for its process resistance as described below on the basis of its short-term soldering heat resistance and ultraviolet light resistance.

○: Both the short-term soldering heat resistance and the ultraviolet light resistance are evaluated as ○.

Δ: One of the short-term soldering heat resistance and the ultraviolet light resistance is evaluated as ○.

x: Neither the short-term soldering heat resistance or the ultraviolet light resistance is evaluated as ○.

<Short-Term Soldering Heat Resistance>

Produced optical waveguides having a length of 5 cm were tested by being heated in the air at 250° C. for 15 minutes. Any changes in external shape of the optical waveguide after the heating compared to the external shape of the optical waveguide before the heating were visually confirmed. In addition, the optical loss of the optical waveguide at a wavelength of 850 nm after the test was measured, and a variation was calculated by comparing the optical loss before and after the test.

○: No change in external shape observed after the test, and variation in optical loss is 0.3 dB or less.

Δ: No change in external shape observed after the test, and variation in optical loss is 0.3 to 0.5 dB.

x: Change in external shape observed after the test, or variation in optical loss is larger than 0.5 dB.

<Ultraviolet Light Resistance>

Produced optical waveguides were tested by being irradiated with light from a high-pressure mercury lamp having a center wavelength of 365 nm and a light quantity of 10 mW/cm² for 100,000 seconds. Any changes in external shape of the optical waveguide after the test compared to the external shape of the optical waveguide were visually observed. In addition, the optical loss of the optical waveguide at a wavelength of 850 nm after the test was measured, and a variation was calculated by comparing the optical loss before and after the test.

○: No change in external shape observed after the test, and variation in optical loss is 0.3 dB or less.

Δ: No change in external shape observed after the test, and variation in optical loss is 0.3 to 0.5 dB.

x: Change in external shape is observed after the test, or variation in optical loss is larger than 0.5 dB.

<Evaluation of Optical Waveguide for Environment Resistance>

Optical waveguides were comprehensively evaluated for environment resistance as described below by a heat cycle property test and a high-temperature, high-humidity test.

○: Both the heat cycle property test and the high-temperature, high-humidity test are evaluated as ○.

Δ: One of the heat cycle property test or the high-temperature, high-humidity test is evaluated as ○.

x: Neither the heat cycle property test or the high-temperature, high-humidity test is evaluated as ○.

<Heat Cycle Property Test>

A produced optical waveguide was stored in a thermostat capable of being operated by a program and held at −40° C. for 5 minutes, the temperature of the thermostat was increased to 120° C. at a rate of 1° C./min, the optical waveguide was held at 120° C. for 5 minutes, and the temperature of the thermostat was decreased to −40° C. at a rate of 1° C./min. The above operation was defined as one cycle, and the optical waveguide was tested for 30 cycles. After the completion of the test, any changes in external appearance of the test piece after the test compared to the external appearance of the test piece before the test were confirmed. In addition, the optical loss of the test piece at a wavelength of 850 nm after the test was measured, and a variation was measured by comparing the optical loss before and after the test.

○: No change in external shape observed after the test, and variation in optical loss is 0.3 dB or less.

Δ: No change in external shape observed after the test, and variation in optical loss is 0.3 to 0.5 dB.

x: Change in external shape observed after the test, or variation in optical loss is larger than 0.5 dB.

<High-Temperature, High-Humidity Test>

Produced optical waveguides were stored in a thermo-hygrostat, and tested at 85°C.×85% RH for 1,000 hours. After the completion of the test, any changes in external appearance of the test piece after the test compared to the external appearance of the test piece before the test were confirmed. In addition, the optical loss of the test piece at a wavelength of 850 nm before and after the test was measured and a variation was calculated by comparing the optical loss before and after the test.

○: No change in external shape observed after the test, and variation in optical loss is 0.3 dB or less.
Δ: No change in external shape observed after the test, and variation in optical loss is 0.3 to 0.5 dB.
x: Change in external shape is observed after the test, or variation in optical loss is larger than 0.5 dB.

[Table 2]

TABLE 2

| | Application | Composition | Refractive index | Optical loss (dB/cm) | Process resistance | Environment resistance |
|---|---|---|---|---|---|---|
| Example 13 | Core | Example 2 | 1.528 | 0.078 | ○ | ○ |
| | Clad | Example 5 | 1.511 | | | |
| Example 14 | Core | Example 3 | 1.524 | 0.045 | ○ | ○ |
| | Clad | Example 6 | 1.507 | | | |
| Example 15 | Core | Example 4 | 1.520 | 0.067 | ○ | ○ |
| | Clad | Example 7 | 1.499 | | | |
| Example 16 | Core | Example 1 | 1.531 | 0.05 | ○ | ○ |
| | Clad | Example 9 | 1.508 | | | |
| Example 17 | Core | Example 11 | 1.503 | 0.086 | ○ | ○ |
| | Clad | Example 8 | 1.480 | | | |
| Example 18 | Core | Example 10 | 1.507 | 0.063 | ○ | ○ |
| | Clad | Example 12 | 1.496 | | | |
| Comparative Example 3 | Core | Comparative Example 1 | 1.536 | 0.085 | x | x |
| | Clad | Comparative Example 2 | 1.520 | | | |

As shown in Table-2, the optical waveguides of the present invention showed low optical loss, were excellent in process resistance and environmental resistance, and simultaneously satisfied heat resistance, moisture resistance, and transparency (low optical loss property) at a communication wavelength simultaneously.

It should be noted that the formation of a film-like optical waveguide was attained by laminating a precoat agent (such as a polyimide resin or an epoxy novolak resin) on a sintered silicon substrate, adopting the same production method as that described above, and peeling off the calcined silicon substrate and the precoat agent (membrane). In addition, the resultant film-like optical waveguides had good properties as in the case of each of the above examples.

In addition, the optical waveguides of the present invention have excellent properties irrespective of whether the optical waveguide was produced on a sintered silicon substrate, the optical waveguide was a film-like optical waveguide, or the optical waveguide was produced as an optical waveguide with a metal (copper) mark by an ordinary method.

The invention claimed is:

1. A curable composition for an optical material, comprising as essential components:

(A): a silicon-containing polymer having an epoxy group, containing a silicon atom having at least three oxygen atoms bonded thereto, having an Si—R group where R represents an alkyl group, a phenyl group, an alkylphenyl group, or a phenylalkyl group, or an alkyl group, phenyl group, alkylphenyl group, or phenylalkyl group in which some or all hydrogen atoms are substituted with a halogen or deuterium atom and an Si—OR' group where R' represents an alkyl group, a phenyl group, an alkylphenyl group, or a phenylalkyl group, or an alkyl group, phenyl group, alkylphenyl group, or phenylalkyl group in which some or all hydrogen atoms are substituted with a halogen or deuterium atom, and having a weight average molecular weight of 1,000 to 1,000,000;

(B): an epoxy resin represented by the following general formula (1):

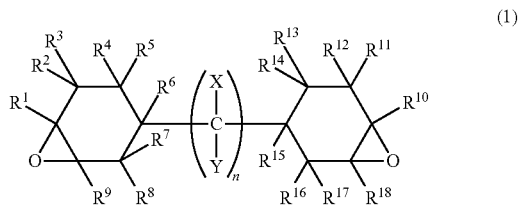

(1)

where X and Y may be identical to or different from each other, and each represent a monovalent group selected from a hydrogen atom, an alkyl group, a fluoroalkyl group, a perfluoroalkyl group, a phenyl group, an alkylphenyl group, a fluorophenyl group, a perfluorophenyl group, a fluoroalkylphenyl group, and a perfluoroalkylphenyl group, n represents a positive number, and $R^1$ to $R^{18}$ each represent a hydrogen atom, a halogen atom, a hydrocarbon group which may contain an oxygen atom or a halogen atom, or an alkoxy group which may have a substituent; and (C): an energy ray-sensitive cationic polymerization initiator.

2. The curable composition according to claim 1, further comprising (D): an epoxy resin represented by the following general formula (2):

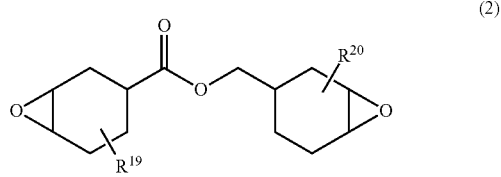

(2)

where $R^{19}$ and $R^{20}$ may be identical to or different from each other, and each represent hydrogen or an alkyl group having 1 to 4 carbon atoms.

3. The curable composition according to claim 2, further comprising one or more kinds of components selected from the group consisting of solvents, other cationic polymerizable organic substances (excluding epoxide compounds corresponding to any one of components (A), (B) or (D)), acid diffusion control agents, photosensitizers, thermoplastic polymer compounds and fillers.

4. The curable composition according to claim 2, further comprising one or more kinds of resin additives selected from the group consisting of heat-sensitive cationic polymerization initiators, colorants, leveling agents, defoaming agents, thickeners, flame retardants, antioxidants and stabilizers.

5. An optical waveguide, comprising a core formed by curing the curable composition according to claim 2.

6. An optical waveguide, comprising a core formed by curing a first curable composition according to claim 2, and a cladding formed by curing a second, different curable composition according to claim 2, wherein the first curable composition has a higher refractive index than the second curable composition.

7. A method of producing an optical waveguide, comprising a step of curing the curable composition according to claim 2 to form a core.

8. A method of producing an optical waveguide, comprising a step of curing a first curable composition according to claim 2 to form a core, and a further step of curing a second, different curable composition according to claim 2 to form a clad, wherein the first curable composition has a higher refractive index than the second curable composition.

9. The curable composition according to claim 1, further comprising one or more kinds of components selected from the group consisting of solvents, other cationic polymerizable organic substances (excluding epoxide compounds corresponding to any one of components (A) or (B)), acid diffusion control agents, photosensitizers, thermoplastic polymer compounds and fillers.

10. The curable composition according to claim 9, further comprising one or more kinds of resin additives selected from the group consisting of heat-sensitive cationic polymerization initiators, colorants, leveling agents, defoaming agents, thickeners, flame retardants, antioxidants and stabilizers.

11. An optical waveguide, comprising a core formed by curing the curable composition according to claim 9.

12. An optical waveguide, comprising a core formed by curing a first curable composition according to claim 9, and a cladding formed by curing a second, different curable composition according to claim 9, wherein the first curable composition has a higher refractive index than the second curable composition.

13. A method of producing an optical waveguide, comprising a step of curing the curable composition according to claim 9 to form a core.

14. A method of producing an optical, comprising a step of curing a first curable composition according to claim 9 to form a core, and a further step of curing a second, different curable composition according to claim 9 to form a clad, wherein the first curable composition has a higher refractive index than the second curable composition.

15. The curable composition according to claim 1, further comprising one or more kinds of resin additives selected from the group consisting of heat-sensitive cationic polymerization initiators, colorants, leveling agents, defoaming agents, thickeners, flame retardants, antioxidants and stabilizers.

16. An optical waveguide comprising a core formed by curing the curable composition according to claim 15.

17. An optical waveguide, comprising a core formed by curing a first curable composition according to claim 15, and a cladding formed by curing a second, different curable composition according to claim 15, wherein the first curable composition has a higher refractive index than the second curable composition.

18. A method of producing an optical waveguide, comprising a step of curing the curable composition according to claim 15 to form a core.

19. A method of producing an optical waveguide, comprising a step of curing a first curable composition according to claim 15 to form a core, and a further step of curing a second, different curable composition according to claim 15 to form a clad, wherein the first curable composition has a higher refractive index than the second curable composition.

20. An optical waveguide comprising a core formed by curing the curable composition according to claim 1.

21. An optical waveguide comprising a core formed by curing a first curable composition according to claim 1, and a cladding formed by curing a second, different curable composition according to claim 1, wherein the first curable composition has a higher refractive index than the second curable composition.

22. A method of producing an optical waveguide, comprising a step of curing the curable composition according to claim 1 to form a core.

23. A method of producing an optical waveguide, comprising a step of curing a first curable composition according to claim 1 to form a core, and a further step of curing a second, different curable composition according to claim 1 to form a clad.

* * * * *